US006617389B1

(12) United States Patent
Delaunoit et al.

(10) Patent No.: US 6,617,389 B1
(45) Date of Patent: Sep. 9, 2003

(54) AQUEOUS POLYMER DISPERSION FOR USE IN WATER BASED GLOSSY LACQUERS

(75) Inventors: Genevieve Delaunoit, Bergen op Zoom (NL); Dirk Emiel Paula Mestach, Nijlen (BE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/271,129

(22) Filed: Mar. 17, 1999

Related U.S. Application Data

(63) Continuation of application No. PCT/EP97/04882, filed on Sep. 2, 1997, now abandoned.

(30) Foreign Application Priority Data

Sep. 18, 1996 (NL) ............................................. 1004057

(51) Int. Cl.$^7$ ............................................... C08L 39/00
(52) U.S. Cl. ..................... 524/555; 524/317; 524/558; 524/560; 526/312; 526/318.3; 526/318.4; 526/318.44
(58) Field of Search ............................... 524/253, 236, 524/559, 555, 558, 317, 560; 526/312, 318.3, 318.4, 318.44

(56) References Cited

U.S. PATENT DOCUMENTS

| 3,804,881 A | | 4/1974 | Basset et al. ................ 260/470 |
| 4,039,500 A | | 8/1977 | Bassett et al. .......... 260/29.6 R |
| 4,904,724 A | * | 2/1990 | Auchter et al. .............. 524/458 |
| 4,966,939 A | * | 10/1990 | Craig .......................... 524/811 |
| 5,021,469 A | | 6/1991 | Langerbeins et al. ........ 523/201 |
| 5,084,505 A | * | 1/1992 | Biale ........................... 524/555 |
| 5,244,963 A | * | 9/1993 | Biale ........................... 524/555 |
| 5,326,814 A | | 7/1994 | Biale ........................... 524/555 |
| 5,461,103 A | * | 10/1995 | Bafford et al. ............... 524/460 |
| 6,075,079 A | * | 6/2000 | Helmer et al. ............... 524/253 |

FOREIGN PATENT DOCUMENTS

| FR | 2 328 721 | 5/1977 | ............. C08F/10/00 |
| GB | 1 566 861 | 5/1980 | ............. C08F/2/42 |
| WO | WO 92/01004 | 1/1992 | ............. C08F/2/00 |

OTHER PUBLICATIONS

*Bulletin of the American Physical Society*, T.G. Fox, vol. 1, 3, p. 123 (1956).
*Polymer Handbook*, 2$^{nd}$ Edition, pp. 139–192.

* cited by examiner

Primary Examiner—Tatyana Zalukaeva
(74) Attorney, Agent, or Firm—Joan M. McGillycuddy; David H. Vickrey; Michelle J. Burke

(57) ABSTRACT

An aqueous polymer dispersion is disclosed for use in coating compositions comprising monomer compositions A and B, wherein the difference of the $T_g$ of A and B after monomer polymerization is at least 60° C. and with the highest of such $T_g$ being at least 40° C., with the overall monomer composition being formed by ethylenically unsaturated compounds comprising:

1) one or more compounds selected from alkenyl aromatic monomer, acrylonitrile, an alkyl, (hetero)cycloalkyl or aralkyl ester of acrylic acid and methacrylic acid having 4–22 carbon atoms, acrylamide and methacrylamide, acrylamide and methacrylamide N-substituted with an alkyl, cycloalkyl or aralkyl group having 1–18 carbon atoms, vinyl acetate and vinyl versatate, optionally having a second functional group for reacting with curing agent, 2) an ethylenically unsaturated carboxylic acid and 3) a nitrogenous adhesion promoting, copolymerizable monomer.

9 Claims, No Drawings

AQUEOUS POLYMER DISPERSION FOR USE IN WATER BASED GLOSSY LACQUERS

This is a continuation of International Application No. PCT/EP97/04882, with an international filing date of Sep. 2, 1997, designating the United States of America, now abandoned.

The invention pertains to an aqueous polymer dispersion which can be obtained by the emulsion polymerization of α,β-ethylenically unsaturated monomers comprising a monomer composition A and a monomer composition B, with the reactor being fed the monomer composition A continually being replenished with the monomer composition B, to a process for preparing such dispersions, to aqueous coating compositions incorporating these dispersions, and to high gloss topcoats obtained using these coating compositions.

BACKGROUND OF THE INVENTION

The preparation of polymer dispersions of the aforesaid type is disclosed, int. al., in U.S. Pat. No. 3,804,881. The monomer flow charged to the reactor is continually varying in compositional content through the supply of one or more monomer flows of a different composition to the vessel from which the monomer flow is fed to the reactor. In this way particles continually varying in compositional content are obtained. A key advantage of the process described in this document is indicated to be that the thus obtained polymer dispersions are characterised by a very broad glass transition temperature range. As a result, the topcoats obtained using coating compositions prepared with these dispersions are more flexible at room temperature and have less tendency to exhibit surface tack. The adhesion of the topcoats can be improved still further by a gradual and continuous increase in the concentration of adhesion promoting monomers in monomer composition A prior to the conclusion of the polymerization reaction, which will cause a layer of adhesion promoting functional groups to form on the surface of the disperse particles.

Although coating compositions which contain dispersions prepared in this manner have very good adhesion as compared with coating compositions which do not incorporate adhesion promoting monomers, it was found that the gloss of the topcoats obtained using coating compositions containing these dispersions shows greater similarity to that of topcoats obtained using coating compositions incorporating dispersions of the core/shell type. It was further found that the simultaneous presence of adhesion promoting monomers and carboxylic groups-containing monomers required for the stability of the dispersions is attended with substantial contamination of the reactor.

It should be noted that polymer dispersions with which coating compositions for topcoats having high gloss and good adhesion can be obtained were recently proposed in U.S. Pat. No. 5,021,469. Unlike the presently proposed polymer dispersions, the known polymer dispersions are made up of particles having a core and a shell, the core consisting of a material having a glass transition temperature (Tg) of at least 40° C. and the shell consisting of a material having a Tg of less than 70° C. and at least 20° C. below the Tg of the core material. The shell contains, int. al., ethylenically unsaturated carboxylic acids and nitrogenous, adhesion promoting monomers. Unlike with the preparation of the presently proposed polymer dispersions, there is substantial contamination of the reactor during the preparation. Moreover, when using the presently proposed dispersions topcoats of higher gloss and better adhesion can be obtained.

U.S. Pat. No. 5,326,814 proposes a more specific process for preparing polymer dispersions for the aforesaid use. To improve adhesion, up to 5 wt. % of an ethyleneureido group-containing monomer and 1 to 3 wt. % of an ethylenically unsaturated carboxylic acid are added. The preparative process involves first making a pre-emulsion of all the monomers except for those having an ethyleneureido group. Next, the pre-emulsion is slowly added to the reactor, with an emulsion of the ethyleneureido group-containing monomer also being introduced into the reactor during the first part of the addition process.

The topcoats obtained using these dispersions likewise are in need of improvement when it comes to gloss and tack. Moreover, the process described in this document also has substantial contamination of the reactor. Where the text refers to glass transition temperature, Tg, what is meant is Tg as calculated in accordance with a method described by T. G. Fox in the *Bulletin of the American Physical Society*, Volume 1, Issue 3, p. 123 (1956). This calculation employs the constants as specified by J. Brandup and E. H. Imergut in *Polymer Handbook*, $2^{nd}$ edition, J. Wiley & Sons, New York, pp. 139–192 (1975). (Meth)acrylate in the text stands for acrylate as well as methacrylate. (Hetero)cycloalkyl in the text stands for heterocycloalkyl as well as cycloalkyl.

The invention now provides polymer dispersions with markedly enhanced properties, notably as regards the adhesion and gloss of topcoats obtained using coating compositions containing these dispersions, without any problems being experienced during the preparation of these dispersions as a result of contamination of the reactor.

SUMMARY OF THE INVENTION

The invention consists in that in the preparation of a polymer dispersion of the known type mentioned in the opening paragraph use is made of the monomer compositions A and B, one of which has a Tg in the polymerized state of at least 40° C., as well as at least 60° C. higher than that of the other monomer composition in the polymerized state, and the overall monomer composition is formed by ethylenically unsaturated compounds composed of:

1) at least 80 wt. % of one or more compounds selected from the group of alkenyl aromatic monomer, acrylonitrile, an alkyl, (hetero)cycloalkyl or aralkyl ester of acrylic acid and methacrylic acid having 4–22 C-atoms, acrylamide and methacrylamide, acrylamide and methacrylamide N-substituted with an alkyl, cycloalkyl or aralkyl group having 1 to 18 carbon atoms, vinyl acetate, and vinyl versatate, with up to 25 wt. % of these compounds optionally containing a second functional group capable of reacting with an appropriate curing agent,
2) 0.1 to 5 wt. % of an ethylenically unsaturated carboxylic acid, and
3) 0.1 to 5 wt. % of a nitrogenous, adhesion promoting copolymerizable monomer, with the proviso that at least 60 wt. % of the carboxylic acid is incorporated into the monomer composition holding less than 40 wt. % of the adhesion promoting comonomer, with the mass flow to the reactor of monomers of the composition containing monomer composition A, which is larger by a factor of 1.1 to 11, proceeding simultaneously with the mass flow of monomers of monomer composition B to the composition containing monomer composition A.

The invention also pertains to a process for preparing aqueous polymer dispersions of the aforesaid composition by subjecting a monomer composition A which is continually replenished with a monomer composition B to an emulsion polymerization, with the Tg of one of the monomer compositions in the polymerized state being at least 40° C., as well as at least 60° C. higher than the Tg of the other monomer composition in the polymerized state, with the overall monomer composition being formed by ethylenically unsaturated compounds composed of:

1) at least 80 wt. % of one or more compounds selected from the group of alkenyl aromatic monomer, acrylonitrile, an alkyl, (hetero)cycloalkyl or aralkyl ester of acrylic acid and methacrylic acid having 4 to 22 C-atoms, acrylamide and methacrylamide, acrylamide and methacrylamide N-substituted with an alkyl, cycloalkyl or aralkyl group having 1 to 18 carbon atoms, vinyl acetate, and vinyl versatate, with up to 25 wt. % of these compounds optionally containing a second functional group capable of reacting with an appropriate curing agent, 2) 0.1 to 5 wt. % of an ethylenically unsaturated carboxylic acid, and 3) 0.1 to 5 wt. % of a nitrogenous, adhesion promoting, copolymerisable monomer, with the proviso that at least 60 wt. % of the carboxylic acid is incorporated into the monomer composition holding less than 40 wt. % of the adhesion promoting comonomer, with the mass flow to the reactor of monomers of the composition containing monomer composition A, which is larger by a factor of 1.1 to 11, proceeding simultaneously with the mass flow of monomers of monomer composition B to the composition containing monomer composition A.

DETAILED DESCRIPTION OF THE INVENTION

By "mass flow to the reactor of monomers of the composition containing monomer composition A" is meant according to the invention the amount of mass (A+B) fed to the reactor per unit of time. By "mass flow of monomers of monomer composition B to the composition containing monomer composition A" is meant the amount of mass of monomer composition B introduced into the tank holding the composition containing monomer composition A per unit of time. Monomer composition B can be charged from a single tank into the one holding monomer composition A. Alternatively, the monomers of composition B can be charged into the tank holding monomer composition A from tanks holding different compositions rather than from a single tank. In that case, composition B is first formed in situ in the tank holding monomer composition A. The mass flow of the monomer composition charged to the reactor is up to 11 times higher than the mass flow of monomer composition B to the tank in which monomer composition A is present. In this process, preference is given to a mass flow of up to 5 times higher than the mass flow of monomer composition B to the tank. Optimum results were obtained with a mass flow to the reactor twice as high as the mass flow of monomer composition B to the tank holding the composition containing monomer composition A.

The monomer composition having a Tg in the polymerized state of at least 40° C. is essentially composed of monomers where the Tg of the homopolymers is at least 80° C., such as styrene, α-methyl styrene, acrylonitrile, and methacrylonitrile, methyl, sopropyl, tert.butyl, and cyclohexyl methacrylate or vinyl chloride.

Examples of comparatively soft monomers where the Tg of the homopolymers generally is below 80° C. and preferably below 40° C. are acrylate esters of the formula $CH_2=C(R^1)-C(O)-OR^2$, wherein $R^1$ stands for a hydrogen atom or a methyl group and $R^2$ stands for an alkyl or cycloalkyl group having at least 2 and not more than 18 carbon atoms. Examples include n-butyl acrylate, sec.butyl methacrylate, 2-ethylhexyl methacrylate, iso-octyl acrylate, 2-ethylhexyl acrylate, n-octyl acrylate, nonyl acrylate, dicyclopentenyloxyethyl methacrylate, isodecyl acrylate, lauryl methacrylate, and stearyl methacrylate. Examples of aralkyl esters are 2-phenylethyl methacrylate and 3-phenylpropyl methacrylate. Examples of heterocyclic alkyl esters of acrylic and methacrylic acid, respectively, are furfuryl methacrylate and tetrahydrofurfuryl acrylate.

Examples of other suitable monomers are N-substituted compounds of acrylamide and methacrylamide such as N-tert.butyl acrylamide, N-tert.hexyl acrylamide, N-tert.octyl acrylamide, N-(1.5-dimethyl-1-ethyl)hexyl acrylamide, N-(1,1-dimethyl-2-phenyl)ethyl acrylamide, N-cyclohexyl acrylamide, N-(1-methylbutyl)acrylamide, N-ethyl acrylamide, N-ethylhexyl acrylamide, N-butyl methacrylamide, and N-cyclohexyl methacrylamide.

Also, functional groups such as hydroxyl, amino, epoxy, and carbonyl may be present, or ethylenically unsaturated groups such as are present in the reaction product of an unsaturated fatty acid with glycidyl methacrylate and dicyclopentadienyl acrylate.

Examples of hydroxy-functional monomers are 2-hydroxyethyl methacrylate, 2-hydroxypropyl methacrylate, 2-hydroxyethyl acrylate, 2-hydroxypropyl acrylate, and hydroxybutyl acrylate. The hydroxy-functional monomers can be cross-linked with polyisocyanates which may be blocked or not, melamines, and urea resins.

Examples of amino-functional monomers are N,N-dimethyl aminoethyl methacrylate, N,N-dimethyl aminoethyl acrylate, and N-tert.butyl aminoethyl methacrylate.

The amino-functional monomers can be cross-linked with epoxy-functional compounds, polyisocyanates which may be blocked or not, and polycarboxylic acids.

One example of an epoxy-functional monomer is glycidyl methacrylate. This monomer can be cross-linked with di- and multifunctional compounds having a carboxyl, hydroxyl and/or amino function.

Examples of carbonyl-functional monomers are diacetone acrylamide and acetoacetoxyethyl methacrylate. They can be cross-linked with hydrazides and amines.

Examples of compounds where the Tg of the homopolymers is at least 80° C. are alkenyl aromatic monomers such as styrene, o-methyl styrene, p-methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof.

Also, cross-linking agents having two or more, say, two to six, ethylenically unsaturated groups per molecule may be present, such as triallyl cyanurate, vinyl or allyl acrylate or methacrylate, diol diacrylates and diol dimethacrylates, and methylene bisacrylamide or methylene bismethacrylamide. The quantity of these cross-linking agents used generally ranges from 0.01 to 5 wt. %. The presence of a small quantity of cross-linking agent can have a beneficial effect on the film's hardness and the adhesion properties.

The weight ratio of monomer composition A to monomer composition B can vary within a wide range, but is generally selected in the range of 1:10 to 10:1. As a rule, preference is given to a composition where the monomer composition which has the highest Tg in the polymerized state makes up 10 to 50 wt. % of the polymer dispersion, calculated on the weight of the polymer. The ethylenically unsaturated carboxylic acid makes up at least 0.1 to 5 wt. % of the overall monomer composition. Preferably, at least 60 wt. % thereof is incorporated into monomer composition A. Of the adhesion promoting monomer preferably at least 60 wt. % is present in monomer composition B. Examples of suitable ethylenically unsaturated carboxylic acids are acrylic acid, methacrylic acid, maleic acid, fumaric acid, and itaconic acid.

The monomer composition incorporating more than 60 wt. % of the present carboxylic acid preferably contains 65 to 100 wt. % of the overall quantity of carboxylic acid. To enhance the stability of the obtained dispersions during the polymerization process it may be advantageous for up to 20% of the carboxylic acid to be present in the salt form through neutralisation with ammonia, inorganic bases such as alkali hydroxides, e.g., lithium hydroxide, potassium hydroxide or sodium hydroxide, or organic amines, such as N,N-dimethyl ethanolamine, N,N-diethyl ethanolamine, triethyl amine, and morpholine.

Optionally, in addition to the ethylenically unsaturated carboxylic acids other acid, non-carboxylic groups-containing monomers polymerizable under the influence of radicals may be present. As examples may be mentioned 2-acrylamido-2-methylpropane sulphonic acid or the alkali, ammonia or amine salt thereof and the sodium salt of the adduct of allylglycidyl ether to sodium bisulphite.

The monomer composition incorporating more than 60 wt. % of the adhesion promoting monomer preferably contains over 65 wt. % thereof, with optimum results being obtainable at a percentage in the range of 80 to 100 wt. %. Suitable adhesion promoting monomers generally are monomers polymerisable under the influence of radicals and containing amino, ureido or N-heterocyclic groups. Examples of such monomers are dimethyl aminoethyl(meth) acrylate, diethyl aminoethyl(meth)acrylate, 3-dimethylamino-2,2-dimethylpropyl- 1-(meth)acrylate, N-dimethylaminomethyl(meth)acrylamide, N-(4-morpholinomethyl) (meth)acrylamide, vinyl imidazole, and vinyl pyrrolidone. Further mention may be made of compounds having a pyrrolidine, piperidine, morpholine, piperazine, imidazole, pyrrolidin-(2)-one or imidazolidin-2-one (ethylene urea) ring. In this case preference is given to ureido-functional monomers such as N-(2-methacryloxyethyl)ethylene urea, 1-(2-(3-allyloxy-2-hydroxypropylamino) ethyl)-imidazolidin-2-one, and 2-ethyleneureido-ethyl methacrylate.

To promote film forming at lower temperatures also compounds may be incorporated which enter into a chemical combination with other monomeric, difunctional compounds at low temperature, resulting in the polymer being cross-linked.

Examples of such monomers are acrolein, methacrolein, diacetone acrylamide, diacetone methacrylamide, and vinyl acetoacetate. These compounds generally make up 1 to 4 wt. % of the overall monomer composition. At low temperature and in an aqueous medium they react with hydrazides of aliphatic dicarboxylic acids of which 0.3 to 1, preferably 0.4 to 0.8 mole is present per mole of the difunctional compound. Examples of suitable dihydrazides are oxalic dihydrazide, glutaric dihydrazide, adipic dihydrazide, sebacic dihydrazide, maleic dihydrazide, fumaric dihydrazide and/or itaconic dihydrazide.

Within the framework of the invention preference is given to compositions at least 80 wt. % of which is made up of styrene, methyl methacrylate, 2-ethylhexyl acrylate and/or butyl acrylate.

Optimum results are generally obtained when the composition of the monomers forming the polymer dispersion is such that the Tg of the copolymer thereof is in the range of 10 to 40° C. Further, preference is given to a polymer dispersion where the concentration of ethylenically unsaturated carboxylic acid in composition A is at least twice as high as in composition B.

In actual practice, the preparation of the polymer dispersions according to the present invention will generally proceed as follows. In a first process step the use of batchwise emulsion polymerization results in so-called seed particles being formed. The number of formed seed particles is determined essentially by the temperature during polymerization and by the quantity of emulsifier and initiator used in this process. In a subsequent process step more monomer mixture is added, and the seed particles grow to become the final particles of the dispersion. The size of these particles usually does not exceed 250 nm, but preferably is <150 nm.

The emulsion polymerization is carried out using a radical initiator such as alkali or ammonium persulphate, bis(2-ethylhexyl) peroxydicarbonate, di-n-butyl peroxydicarbonate, t-butyl perpivalate, t-butyl hydroperoxide, cumene hydroperoxide, dibenzoyl peroxide, dilauroyl peroxide, 2,2'-azobisisobutyronitrile, and 2,2'-azobis-2-methyl butyronitrile. Suitable reducing agents which are used in combination with, e.g., a persulphate or a hydroperoxide include: ascorbic acid, sodium formaldehyde sulphoxylate, thiosulphates, disulphates, hydrosulphates, water-soluble amines, such as diethylene triamine, triethylene tetraamine, tetraethylene pentamine, N,N'-dimethyl ethanolamine, N,N-diethyl ethanolamine, and reducing salts, such as cobalt, iron, nickel, and copper sulphate. If so desired, a chain-length regulator, e.g., mercaptoethanol, n-octyl mercaptan, dodecyl mercaptan or 3-mercaptopropionic acid may be employed.

The copolymerization of the monomer mixtures is generally carried out under atmospheric pressure at a temperature of 40–100° C., preferably 60–90° C., in an atmosphere of an inert gas, such as nitrogen. If so desired, however, it is also possible to carry out the copolymerization under elevated pressure and at a temperature of 40–100° C. or higher.

As a rule, the monomer concentration of the two monomer compositions is selected such that the solids content of the polymer dispersion is in the range of 25 to 60 wt. %. The monomers can be fed as such, but usually a pre-emulsion is employed.

When preparing the emulsion usually an emulsifier is employed. Preferably, the emulsifiers used in the emulsion polymerization are of an anionic or non-ionic nature. Examples of anionic emulsifiers are: potassium laurate, potassium stearate, potassium oleate, sodium decyl sulphate, sodium dodecyl sulphate, and sodium rosinate. Examples of non-ionic emulsifiers are: linear and branched alkyl and alkylaryl polyethylene glycol ethers and thioethers and linear and branched alkyl and alkylaryl polypropylene glycol ethers and thioethers, alkylphenoxypoly(ethylenoxy) ethanols such as the adduct of 1 mole of nonylphenol to 5–50 moles of ethylene oxide, or the alkali salt or ammonium salt of the sulphate or the phosphate of said adduct.

The dispersions according to the invention are pre-eminently suited to be incorporated into an aqueous coating composition. These coating compositions can be hardened by physical drying. Curing can also be carried out in a different manner, when the addition polymer contains hydroxyl groups and the aqueous dispersion contains a curing agent which reacts with hydroxyl groups. Suitable curing agents include N-methylol- and/or N-methylol ether groups-containing aminoplasts obtained by reacting an aldehyde, e.g., formaldehyde, with an amino groups- or amido groups-containing compound, such as melamine, urea, N,N'-ethylene urea, dicyanodiamide, and benzoguanamine. The resulting compounds preferably are wholly or partially etherified with alcohols having 1 to 6 carbon atoms, such as methanol, ethanol, n-propanol, isopropanol, n-butanol, isobutanol, amyl alcohol, hexanol, or mixtures thereof. Especially favourable results can be obtained when use is made of a methylol melamine having 4 to 6 methyl groups per molecule of melamine, with at least 3 methylol groups being etherified with butanol, or a condensation product of formaldehyde and N,N'-ethylene diurea etherified with butanol. Other suitable curing agents are, e.g., water-dispersible polyisocyanates which may be blocked or not, such as a methylethyl ketoxime-blocked, isocyanate group-containing adduct of a polyisocyanate to a hydroxycarboxylic acid, e.g., dimethylol propionic acid.

The dispersions according to the invention can be applied to a substrate in any manner desired, e.g., by means of rolling, spraying, brushing, sprinkling, flow coating, dipping, (electrostatic) spraying, or coating by electrophoresis. Suitable substrates include those of wood, metal, paper, hardboard and softboard, concrete, stone, masonry, glass, ceramic material, and synthetic material. Curing can be carried out at ambient temperature or, optionally, at an elevated temperature to reduce the curing time. If so desired, the composition can be baked at higher temperatures, e.g., of between 60 and 160° C., in a drying oven for 10 to 60 minutes.

The invention will be further illustrated below with reference to the following examples, which are submitted for a better understanding of the invention only. They are not to be construed as being limiting in any manner whatsoever. Unless otherwise specified, all parts in the examples and comparative examples are parts by weight.

The viscosity in the examples below was determined using a Brookfield LVT viscometer with No. 3 spindle and 60 revolutions per minute (rpm) at 20° C.

The solids content, SC, was determined in accordance with ISO 3251.

The gloss was determined with the aid of a BYK Haze-gloss 4601 in accordance with ISO 2813.

The particle size was determined by means of dynamic light scattering using a Malvern Autosizer Lo-C. The contamination of the reactor was measured by filtering the dispersion through a 250 mesh (about 60 $\mu$m) filter gauze, and drying and weighing the residue. The percentage by weight is calculated on the overall dispersion.

Sticking together (blocking) was measured using a BYK Gardner Blocking Tester (as per Rohm & Haas). This test apparatus was used in a climatisation room to measure, at room temperature and a relative humidity (RH) of 50%, the force required to separate two panels first aged for 6 days and then placed with the paint surfaces face to face. To this end the coating composition to be tested was applied with an automatic film applicator (K Control Coater, RI Print-Coat Instrument, Ltd.) under standard conditions (23° C. and a relative atmospheric humidity of 50% ) as 125 $\mu$m thick films onto a number of white chart forms (Leneta). After 6 days of ageing at 23° C. and 50% RH small rectangles of 25×50 mm were cut out. The side of these rectangles not covered with coating composition was then taped to glass slides with double-face adhesive tape. A BYK Gardner centering device was used to stack the slides two by two, with the coating compositions placed face to face, after which a load weight of 1000 g was placed on the slides for 2 hours. Next, the slides were arranged in the Blocking Tester, and measurements were carried out with load weights of 0.2500 g and 5000 g. The tables below list the force required to separate the films for the different coating compositions.

The hardness according to König was determined in accordance with DIN 5157. Wet adhesion was measured as follows. First, a wooden panel was primed with a filler which gives a very flat surface, after which a dark high-gloss paint based on an alkyd resin was applied. The panel was dried for at least 1 month at 23° C. and 50% RH. Half of the panel was sandpapered with 120 grain sandpaper. Next, the coating composition was applied onto the entire panel with a 150 $\mu$m applicator blade. The film was dried for 1 week at 23° C. and 50% RH. A pad of Kleenex tissue soaked with water was applied to the film. Subsequently, a check pattern was made in the two halves using an "ISO-ASTM-DIN-NF crosscut." To this pattern 38 mm wide transparent filament tape (3M, ref. 898F) was stuck, which was quickly pulled loose at a 45° angle without tearing. The result is given on a scale of 0 (no adhesion) to 5 (perfect adhesion without the film coming loose).

EXAMPLE I

Preparation of Polymer Dispersion I

A 2.5 l polymerization reactor equipped with a stirrer, a thermometer, a reflux condenser, and various inlets was filled with:

618.4 g of demineralised water, 29.7 g of emulsifier (sodium salt of nonylphenol ether sulphate having 10 ethylene oxide units (Perlankrol SN ex Akcros Chemicals))

Two tanks, A and B, were filled with monomer mixtures of the following composition:

TABLE 1

| monomer mixture | B | A |
| --- | --- | --- |
| demineralised water | 177.1 | 194.9 |
| Perlankrol SN[1)] | 8.7 | 9.7 |
| diacetone acrylamide | | 31.2 |
| 2-ethylhexyl acrylate | 59.3 | 388.0 |
| Styrene | 197.6 | 62.4 |
| methyl methacrylate | 227.3 | 12.0 |
| Nourycyl MA 123[2)] | 31.2 | — |
| methacrylic acid | 9.9 | 21.3 |
| ammonia (25 wt. %) | 0.5 | 1.3 |

[1)]Perlankrol SN (ex Akcros Chemicals) = sodium salt of nonylphenol ether sulphate having 10 ethylene oxide units
[2)]Nourycyl MA 123 (ex Akzo Nobel Chemicals) = 1-(2-methacroyl oxyethyl) imidazolin-2-one as 50 wt. % solution in methyl methacrylate.

Charged into the reactor were 36 parts of monomer mixture A, after which the contents of the reactor were heated up to a temperature of 72° C. under an atmosphere of nitrogen. Next, a solution of 1.1 parts of sodium persulphate in 10.3 parts of demineralised water were added. On conclusion of the exothermic reaction the temperature was increased to 79° C. The monomer mixture of tank B was pumped into tank A, with vigorous stirring, over a period of 2.5 hours. At the same time, the contents of tank A were pumped into the reactor. Simultaneously with the feeding of the contents of tank A an initiator mixture composed of 1.8 parts of sodium persulphate and 168.9 parts of demineralised water was charged to the reactor. After all additions had ceased the temperature of the reactor was kept at 79° C. for a further 30 minutes. The reaction mixture was then cooled to 65° C. and neutralised with 9.5 parts of ammonia (25 wt. % solution in water), after which there were added to it 1.4 parts of tert.butyl hydroperoxide in 4.6 parts of demineralised water followed by a solution of 0.6 parts of sodium sulphoxylate formaldehyde in 8 parts of demineralised water. After 30 minutes a solution of 19.2 parts of adipodihydrazide in 75.9 parts of demineralised water was added to the reaction mixture. The mixture was cooled to 30° C., and 3.8 parts of ammonia (25 wt. % solution in water) dissolved in 8.7 parts of demineralised water and 3.6 parts of Acticide SR911 (biocide ex Thor Chemicals) were added.

The properties measured on the dispersion were as follows:

pH 8.8, SC 44.6%, viscosity 560 mPas, and particle size 90 nm.

Reactor contamination was about 0.05 wt. %.

Comparative Example IA

Preparation of Polymer Dispersion IA

The comparative example below shows that the simultaneous presence of adhesion enhancing agent and ethylenically unsaturated carboxylic acid leads to contamination of the reactor. The preparation proceeded in a manner analogous to that disclosed in Example I, with the proviso that this time the composition of the monomer mixtures was as follows:

TABLE 2

| monomer mixture | B | A |
|---|---|---|
| demineralised water | 177.1 | 194.9 |
| Perlankrol SN[1)] | 8.7 | 9.7 |
| diacetone acrylamide | | 31.2 |
| 2-ethylhexyl acrylate | 59.3 | 388 |
| styrene | 260 | |
| methyl methacrylate | 164.9 | 74.4 |
| Nourycryl MA 123 | | 31.2 |
| methacrylic acid | 9.9 | 21.3 |
| ammonia (25 wt. % solution in water) | 0.5 | 1.3 |

The properties measured on the dispersion were as follows:

pH 9, SC 44.2%, viscosity 250 mPas, and particle size 95 nm.

Reactor contamination was about 0.1 wt. %.

Comparative Example IB

Preparation of Polymer Dispersion IB

In the comparative example below it is shown that the same monomers as in Example I can be used to obtain a polymer dispersion where the individual particles are composed of a shell and a core. The shell contains both carboxyl groups and more or less basic, adhesion promoting groups. To prevent the carboxyl groups from interfering with the adhesion promoting groups, the shell is applied in two phases.

The preparation proceeded in a manner analogous to that disclosed in Example I, with the proviso that this time use was made of three pre-emulsions instead of two, with these pre-emulsions, unlike in the process adhered to in Example I, being fed to the reactor successively in accordance with the teaching of U.S. Pat. No. 5,021,469 discussed above.

The composition of pre-emulsions 1.2, and 3 is given in the table below.

TABLE 3

| Pre-emulsion | A | B | C |
|---|---|---|---|
| demineralised water | 194.9 | 177.1 | 88.5 |
| Perlankrol SN | 9.7 | 8.7 | 4.35 |
| diacetone acrylamide | 31.2 | | 29.7 |
| 2-ethylhexyl acrylate | 388 | 59.3 | 113.7 |
| Styrene | 62.4 | 260 | 98.8 |
| methyl methacrylate | 12.0 | 164.9 | |
| Nourycryl MA 123 | | | 31.2 |
| methacrylic acid | 21.3 | 9.9 | |

Fed to the reactor was a mixture made up of 618.4 parts of demineralised water, 29.7 parts of Perlankrol SN, and 36 parts of pre-emulsion A. The contents of the reactor were then heated to 72° C. under a nitrogen atmosphere, after which 1.1 parts of sodium persulphate in 10.3 parts of demineralised water were added. On conclusion of the exothermic reaction the temperature was raised to 79° C. The remaining pre-emulsion A and 50% of the initiator mixture were fed to the reactor in 70 minutes, after which the reactor was kept at said temperature for a further 20 minutes. Next, in 40 minutes, pre-emulsion B was added along with 25% of the initiator mixture, whereupon the reactor was kept at a temperature of 79° C. for another 30 minutes. Next, in 40 minutes, pre-emulsion C was added along with the remaining 25% of initiator mixture, after which the temperature of the reaction mixture was kept at 79° C. for 30 more minutes. The dispersion was then cooled to room temperature, neutralised with 15.38 parts of ammonia (25 wt. % solution in water) in 50.14 parts of demineralised water, and filtered.

The properties measured on the dispersion were as follows:

pH 8.7, SC 45.0%, viscosity 1060 mPas, and particle size 85 nm.

Reactor contamination was about 6 wt. %.

Comparative Example IC

Preparation of Polymer Dispersion IC

The comparative example below shows that the preparation of the polymer dispersions as described in U.S. Pat. No. 5,326,814, which are obtained from the same monomers as the dispersions according to the present invention, also is attended with noticeable reactor contamination.

The composition of the two pre-emulsions, A and B, is given in the table below.

TABLE 4

| Pre-emulsion | A | B |
|---|---|---|
| demineralised water | 372 | 69.9 |
| Perlankrol SN | 18.4 | |
| diacetone acrylamide | 31.2 | |
| 2-ethylhexyl acrylate | 447.3 | |
| Styrene | 260 | |
| methyl methacrylate | 239.3 | |
| Nourycryl MA 123 | | 31.2 |
| methacrylic acid | 32.2 | |

To the reactor was fed a mixture composed of 618.4 parts of demineralised water, 29.7 parts of Perlankrol SN, and 36 parts of pre-emulsion A. The contents of the reactor were then heated to 72° C. under a nitrogen atmosphere, after which 1.1 parts of sodium persulphate in 10.2 parts of demineralised water were added. On conclusion of the exothermic reaction the temperature was increased to 79° C. Over a period of 2.5 hours the remaining pre-emulsion A was fed to the reactor along with an initiator solution composed of 3.45 parts of sodium persulphate in 160 parts of demineralised water, with pre-emulsion B being fed to the reactor for the first 30 minutes of the process. After all emulsions had been introduced into the reactor, its temperature was kept at 79° C. for a further 30 minutes. Next, the reactor was cooled to room temperature, followed by neutralisation with a 25 wt. % ammonia solution in water until the pH was about 9.

The polymer dispersion was then filtered through an 80 μm perlon filter.

The properties measured on the dispersion were as follows:

pH 9.2, SC 44.3%, viscosity 230 mPas, and particle size 103 nm.

Reactor contamination was about 1.4 wt. %.

EXAMPLE II

Preparation of Polymer Dispersion II

A 3 l polymerization reactor equipped with a stirrer, a thermometer, a reflux condenser, and various inlets was filled with:

833.1 g of demineralised water, 45.0 g of emulsifier (sodium salt of alkyl ether sulphate having 10 ethylene oxide units (Perlankrol EP 36 ex Akcros Chemicals) and 0.2 g of ammonia (25 wt. %).

Two tanks, A and B, were filled with monomer mixtures of the following composition:

TABLE 5

| monomer mixture | B | A |
| --- | --- | --- |
| demineralised water | 238.5 | 262.5 |
| Perlankrol EP 36 | 14.0 | 15.0 |
| diacetone acrylamide | — | 41.2 |
| n-butyl acrylate | — | 569.0 |
| n-butyl methacrylate | 302.0 | — |
| Styrene | 197.6 | 62.4 |
| methyl methacrylate | 336.0 | 55.0 |
| N,N'-dimethyl aminoethyl methacrylate | 26.6 | — |
| methacrylic acid | — | 21.0 |
| ammonia (25 gew. %) | 0.7 | 1.7 |
| Cylink Triallyl cyanurate | 1.0 | 1.0 |
| Cylink TAC ex Cytec Industries | | |

The contents of the reactor were heated to a temperature of 70° C. under an atmosphere of nitrogen, after which 48.5 parts of monomer mixture A and an initiator solution made up of 1.5 parts of sodium persulphate in 13.9 parts of demineralised water were added. On conclusion of the exothermic reaction the temperature was increased to 85° C. and at the same time the dosing of mixtures A and B was started.

The monomer mixture of tank B was pumped into tank A, with vigorous stirring, over a period of 1.5 hours. At the same time, the contents of tank A were pumped into the reactor. Simultaneous with the feeding of the contents of tank A an initiator mixture composed of 2.5 parts of sodium persulphate and 227.4 parts of demineralised water was added to the reactor. After dosing of the 2 monomer mixtures had ceased the temperature of the reaction mixture was kept at 85° C. for a further 30 minutes, after which the pumps of tanks A and B were flushed with 5 parts of demineralised water. Next, the reaction mixture was cooled to 65° C., followed by the incorporation into the reaction mixture over 15 minutes of 1.8 parts of tert.butyl hydroperoxide in 6.3 parts of demineralised water and then of a solution of 0.8 parts of sodium sulphoxylate formaldehyde in 10.8 parts of demineralised water. After 30 minutes a solution of 25.9 parts of adipodihydrazide was added. The mixture was cooled to 30° C., and 4.8 parts of Acticide AS (biocide ex Thor Chemicals) were added.

The properties measured on the dispersion were as follows:

pH 6.8, SC 45.8%, viscosity 20 mPas, and particle size 135 nm.

Reactor contamination was about 0.05 wt. %.

Comparative Example IIA Preparation of Polymer Dispersion IIA

The comparative example below shows that the simultaneous presence of adhesion enhancing agent and ethylenically unsaturated carboxylic acid leads to contamination of the reactor. The preparation proceeded in a manner analogous to that disclosed in Example II, with the proviso that this time the composition of the monomer mixtures was as follows:

TABLE 6

| monomer mixture | B | A |
| --- | --- | --- |
| demineralised water | 238.5 | 262.5 |
| Perlankrol EP 36 | 14.0 | 15.0 |
| diacetone acrylamide | — | 41.2 |
| n-butyl acrylate | 59.3 | 388 |
| n-butyl methacrylate | 260 | |
| methyl methacrylate | 164.9 | 74.4 |
| N,N'-dimethyl aminoethyl methacrylate | — | 26.6 |
| methacrylic acid | 7.0 | 14.0 |
| ammonia (25 wt. % solution in water) | 0.7 | 1.7 |
| Cylink Triallyl cyanurate | 1.0 | 1.0 |
| Cylink TAC ex Cytec Industries | | |

As the dosing of the monomer mixtures was coming to an end, coagulation occurred.

EXAMPLE III

The example below shows that the use of polymer dispersions according to the present invention in coating compositions leads to topcoats having a higher gloss than are obtained when the polymer dispersion of comparative example IA is employed in comparable coating compositions.

The preparation of the coating compositions was as follows. First, a premix based on 210 parts of titanium dioxide (Finntitan RD3 ex Kemira) was prepared in 19.9 parts of water containing 5.7 parts of a dispersant (Dispex GA40 ex Allied Colloids), 6.6 parts of the biocide Acticide EP Paste (ex Thor Chemicals) and 2 parts of the biocide Proxel XL2 (ex Zeneca), 40 parts of propylene glycol, 2 parts of a 90% solution in water of aminomethyl propanol (AMP-90 ex Angus Chemical), and 1 part antifoaming agent (Dehydran 1293 ex Henkel KGAa). The premix was homogenised by being mixed for 10 minutes with a high-speed mixer at 500 to 1000 rpm. 287.2 parts of the premix were then mixed with 595.2 parts of the dispersions of Example I and Comparative example IA, respectively. Following the addition of 19.1 parts of 2,2,4-trimethyl-1,3- pentane diol-monoisobutyrate, 5.1 parts of aqueous ammonia (25%), 3.1 parts of antifoaming agent (Dehydran 1293 ex Henkel KGAa), and 57.3 parts of a thickener solution composed of 50% of Acrysol RM5 (ex Rohm & Haas) the solution was diluted with an 8.6% solution of ammonia in water up to a total of 1000 parts, and the pH of the composition was determined to be about 9. Next, the two compositions were applied onto a glass plate as one 200 μm thick film with the aid of a brushing knife, or with a brush as two films onto a wooden panel already coated with a primer (Flexa Universal Primer, ex Akzo Nobel). The gloss of the coats of lacquer (measured at 20°) in all cases was determined after 24 hours of ageing at room temperature. The outcome of the measurements is listed in the table below.

TABLE 7

| gloss (measured at 20°) | on glass | on primed wood |
|---|---|---|
| coat of lacquer based on dispersion of Example I | 68 | 60 |
| coat of lacquer based on dispersion of Example I A | 63 | 56 |

The results listed in the table above clearly show not only that the preparation of dispersions according to the present invention produces substantially lower contamination of the reactor, but also that the coating compositions so prepared exhibit substantially improved gloss.

Water resistance was determined by the glass plate onto which the coating composition to be tested was coated being immersed in a water bath containing demineralised water at room temperature. The plate coated with the coating composition of Example I did not show any sign of blistering after 7 hours of immersion, whereas microblisters were already forming on the plate of Comparative example IA after 5 hours.

EXAMPLE IV

In a manner analogous to that disclosed in Example III coating compositions were made of the dispersions of Example I and Comparative examples IB and IC. First, a premix based on 199.7 parts of titanium dioxide (type Kronos 2190 ex Kronos Titan GmbH), 1.5 parts of a dispersant (Orotan 1124 ex Rohm & Haas), 1.5 parts of ammonia (25% ), 0.5 parts of a biocide (Proxel XL2 ex Zeneca), and 1 part of an antifoaming agent (Foamaster 111 ex Henkel) was prepared. The premix was dispersed in a horizontal pearl mill to a fineness of less than 10 μm. After there had been added to 608.8 parts each of the polymer dispersions of Example I and Comparative examples IB and IC, 22 parts of a 25% aqueous solution of a wetting agent (Berol 09 ex Berol Nobel), 2 parts of a antifoaming agent (Dehydran 1293 ex Henkel KGAa), 60 parts of demineralised water, and 0.5 parts of a flow additive (Dow Coming PA. 84 ex Dow Corning), the thus obtained polymer dispersions were mixed, with stirring, with 271 parts of the premix. The resulting coating compositions were mixed with 65.2 parts of an aqueous thickener solution (32.6 parts of demineralised water, 4.1 parts of ammonia (25% ), and 28.5 parts of Acrysol (ex Rohm & Haas)), after which demineralised water was employed to achieve a spraying viscosity of 25 s. (DIN cup No. 4).

The resulting coating compositions were sprayed onto MDF panels, whereupon after 7 days the gloss was measured at angles of 20° and 60°. Also, a number of properties were determined, such as the minimum film-forming temperature (MFFT) and the König hardness after 1 day and 1 week. To this end the coating compositions were applied onto a glass plate in one 120 μm thick film. Also measured were blocking and wet adhesion. To this end the coating compositions were coated onto a dark, high-gloss alkyd film (black Levislux ex Akzo Nobel). The outcome of the measurements is shown in Table 8.

TABLE 8

| coating composition based on polymer dispersion of Example | I | I B | I C |
|---|---|---|---|
| gloss at 20° | 33 | 22 | 27 |
| gloss at 60° | 82 | 72 | 79 |
| MFFT (polymer dispersion) | <0° C. | <0° C. | 9° C. |
| König hardness after 1 day | 44s | 31s | 23s |
| König hardness after 1 week | 59s | 32s | 39s |
| blocking (N/cm$^2$) | <0.15 | 0.21 | 9.6 |
| wet adhesion | 5 | 0 | 5 |

The results listed in the table above clearly show that the gloss, the film-forming rate, the König hardness, and the blocking of coating compositions based on the dispersions according to the present invention are superior to those of the well-known polymer dispersions based on core/shell particles.

What is claimed is:

1. An aqueous polymer dispersion obtained by the emulsion polymerization of α,β-ethylenically unsaturated monomers comprising a monomer composition A and a monomer-composition B wherein the Tg of monomer composition A after emulsion polymerization and the Tg of monomer composition B after emulsion polymerization differ from each other such that one of the said Tg is at least 60° C. higher than the other of the said Tg, said higher Tg being at least 40° C., and wherein each of monomer composition A and monomer composition B comprise at least one of:
   1) one or more compounds selected from the group consisting of alkenyl aromatic monomer, acrylonitrile, an alkyl, (hetero)cycloalkyl or aralkyl ester of acrylic acid and methacrylic acid having 4–22 C-atoms, acrylamide and methacrylamide, acrylamide and methacrylamide N-substituted with an alkyl, cycloalkyl or aralkyl group having 1 to 18 carbon atoms, vinyl acetate, and vinyl versatate, with up to 25 wt. % of the selected compounds optionally having a second functional group capable of reacting with a curing agent; and
   2) an ethylenically unsaturated carboxylic acid,
such that a combination of monomer composition A and monomer composition B comprises at least 80 wt. % of the selected compounds of (1), about 0.1 to about 5 wt. % of the carboxylic acid of (2), and about 0.1 to about 5 wt. % of a nitrogenous adhesion promoting copolymerizable monomer, wherein at least 60 wt. % of the carboxylic acid of (2) is comprised in the one of either monomer composition A or monomer composition B that contains less than 40 wt. % of said adhesion promoting copolymerizable monomer;
said emulsion polymerization comprising feeding a reactor with monomer composition A from a holding means containing monomer composition A while simultaneously feeding monomer composition B to the holding means containing monomer composition A, wherein the mass flow of monomer composition A to the reactor is 1.1 to 11 times higher then the mass flow of monomer composition B to the holding means containing monomer composition A.

2. A polymer dispersion according to claim 1, wherein the Tg of monomer composition A in the polymerized form is at least 40° C.

3. A polymer dispersion according to claim 1, wherein the Tg of the polymer obtained after emulsion polymerization from said α,β-ethylenically unsaturated monomers is about 10 to about 40° C.

4. A polymer dispersion according to claim 1, wherein the concentration of ethylenically unsaturated carboxylic acid in one of said monomer composition A and B is at least twice as high as in the other composition A and B of said monomer.

5. A polymer dispersion according to claim 1, wherein the nitrogenous, copolymerizable monomer is a compound having at least one group selected from the group consisting of amino groups, ureido groups, N-heterocyclic groups and mixtures thereof.

6. A process for the preparation of an aqueous polymer dispersion according to claim 1 by the emulsion polymerization of α,β unsaturated polymers comprising a monomer composition A and a monomer composition B, wherein the Tg of one of the polymers obtained after emulsion polymerization from the monomer composition is at least 40° C., which Tg is further at least 60° C. higher than the Tg of the other polymer obtained after emulsion polymerization from the monomer composition, and the overall monomer composition is formed by ethylenically unsaturated compounds comprising:

1) at least 80 wt. % of one or more compounds selected from the group consisting of alkenyl aromatic monomer, acrylonitrile, an alkyl, (hetero)cycloalkyl or aralkyl ester of acrylic acid and methacrylic acid having 4–22 C-atoms, acrylamide and methacrylamide, acrylamide and methacrylamide N-substituted with an alkyl, cycloalkyl or aralkyl group having 1 to 18 carbon atoms, vinyl acetate, and vinyl versatate, with up to 25 wt. % of these compounds optionally comprising a second functional group capable of reacting with a curing agent, 2) about 0.1 to about 5 wt. % of an ethylenically unsaturated carboxylic acid, and about 0.1 to about 5 wt. % of a nitrogenous, adhesion promoting copolymerisable monomer, wherein at least 60 wt. % of the carboxylic acid is incorporated into the monomer composition holding less than 40 wt. % of the adhesion promoting comonomer, said process comprising feeding the reactor with the monomer composition A while simultaneously feeding monomer composition B to the composition containing monomer composition A, wherein the mass flow of monomer composition A to the reactor is 1.1 to 11 times higher then the mass flow of monomer composition B to the composition containing monomer composition A.

7. An aqueous coating composition comprising a polymer dispersion of claim 1 and, optionally, a curing agent.

8. A topcoat comprising an aqueous coating composition of claim 7.

9. A process for the preparation of an aqueous polymer dispersion obtained by the emulsion polymerization of α,β-ethylenically unsaturated monomers comprising a monomer composition A and a monomer composition B wherein the Tg of monomer composition A after emulsion polymerization and the Tg of monomer composition B after emulsion polymerization differ from each other such that one of the said Tg is at least 60° C. higher than the other of the said Tg, said higher Tg being at least 40° C., and wherein each of monomer composition A and monomer composition B comprise at least one of:

1) one or more compounds selected from the group consisting of alkenyl aromatic monomer, acrylonitrile, an alkyl, (hetero)cycloalkyl or aralkyl ester of acrylic acid and methacrylic acid having 4–22 C-atoms, acrylamide and methacrylamide, acrylamide and methacrylamide N-substituted with an alkyl, cycloalkyl or aralkyl group having 1 to 18 carbon atoms, vinyl acetate, and vinyl versatate, with up to 25 wt. % of the selected compounds optionally having a second functional group capable of reacting with a curing agent; and 2) an ethylenically unsaturated carboxylic acid, such that a combination of monomer composition A and monomer composition B comprises at least 80 wt. % of the selected compounds of (1), about 0.1 to about 5 wt. % of the carboxylic acid of (2), and about 0.1 to about 5 wt. % of a nitrogenous adhesion promoting copolymerizable monomer, wherein at least 60 wt. % of the carboxylic acid of (2) is comprised in the one of either monomer composition A or monomer composition B that contains less than 40 wt. % of said adhesion promoting copolymerizable monomer;

said process comprising feeding a reactor with monomer composition A from a holding means containing monomer composition A while simultaneously feeding monomer composition B to the holding means containing monomer composition A, wherein the mass flow of monomer composition A to the reactor is 1.1 to 11 times higher then the mass flow of monomer composition B to the holding means containing monomer composition A.

* * * * *